UNITED STATES PATENT OFFICE.

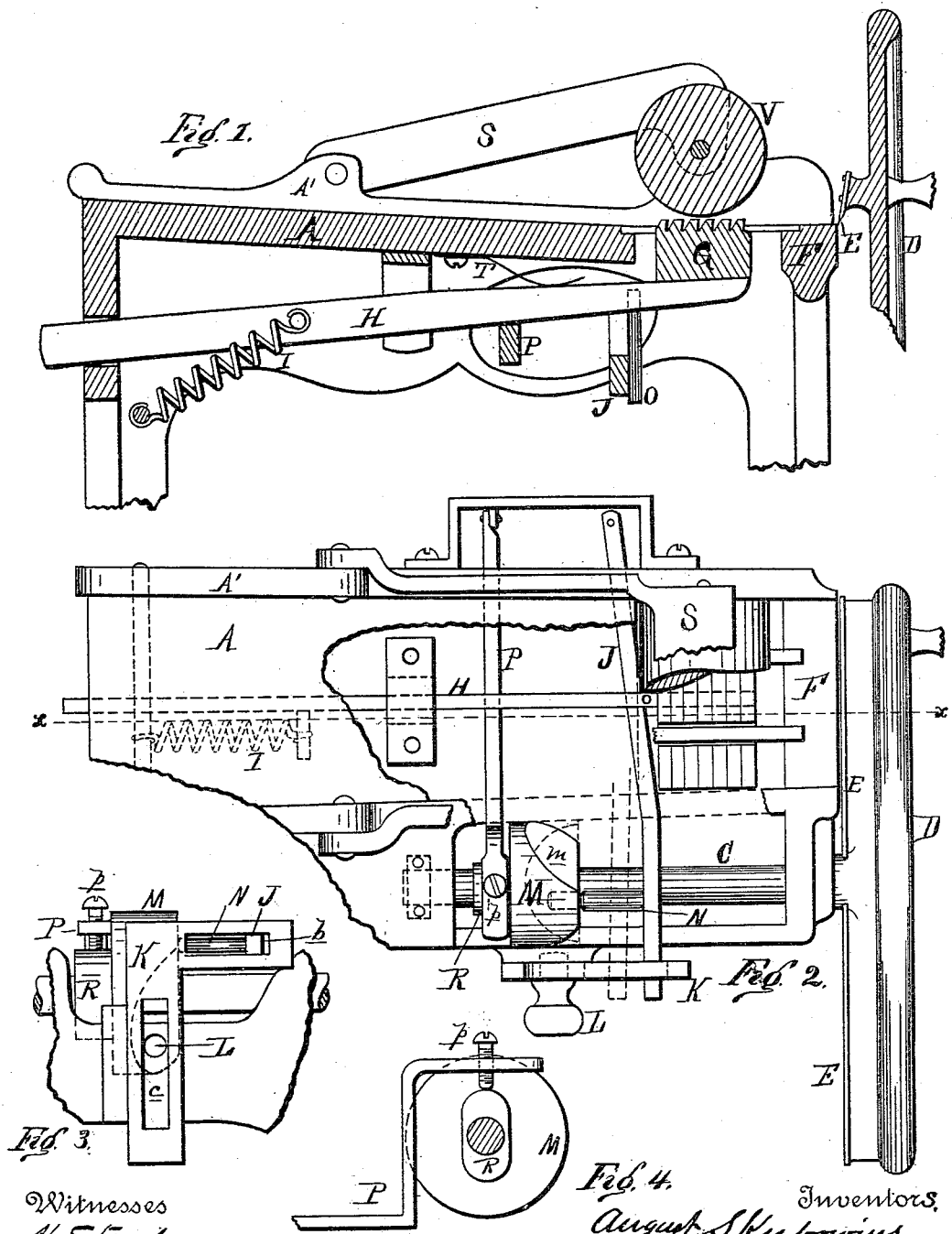

AUGUST SKUBORVIUS AND SAMUEL FULDHEIM, OF CLEVELAND, OHIO.

NOODLE-CUTTING MACHINE.

SPECIFICATION forming part of Letters Patent No. 457,624, dated August 11, 1891.

Application filed February 10, 1891. Serial No. 380,990. (No model.)

*To all whom it may concern:*

Be it known that we, AUGUST SKUBORVIUS and SAMUEL FULDHEIM, citizens of the United States, residing at Cleveland, in the county of Cuyahoga and State of Ohio, have invented certain new and useful Improvements in Noodle-Cutting Machines, of which the following, with the accompanying drawings, is a specification.

This invention relates to certain new and useful improvements in noodle-cutting machines.

The object of the invention is to construct a machine whereby noodles can be cut from the prepared dough and whereby the size of the noodle may be readily changed.

The invention consists in the peculiar construction, arrangement, and combination of the various parts, all as more fully hereinafter set forth, and pointed out in the claims.

Figure 1 is a central vertical longitudinal section of our improved noodle-machine on line $xx$, Fig. 2. Fig. 2 is a top plan with a portion of the bed broken away to show the parts beneath. Fig. 3 is a side elevation of the adjusting-slide. Fig. 4 is a rear elevation of the cam-wheel detached.

In the accompanying drawings, which form a part of this specification, A represents the bed, which is mounted upon suitable legs B.

C is a rotatable shaft, journaled in proper bearings, and upon the outer end of this shaft is secured a hand-wheel D, which carries cutters E, arranged to make a shear cut in connection with the stationary shear-blade F, secured in the front end of the bed A.

G is a serrated faced feed-plate, which projects through an opening in the front portion of the bed A, and this feed-plate is secured to the forward end of the feed-bar H, which latter is provided with a spring I, designed to retract said feed bar and plate, as hereinafter described.

J is an actuating-lever pivoted at one end to the frame of the machine, its opposite end passing through the horizontal slot $b$ of the adjusting-slide K, which latter is vertically adjustable upon the side of the machine by means of the slot $c$ and thumb-nut or screw L.

M is a cam-wheel, the cam-faces $m$ of which are formed diametrically opposite each other, and this wheel M is secured upon the shaft C. A horizontal rearwardly-projecting pin N from the lever J has its free end in close contact with the face of the cam-wheel M.

O is a pin projecting downwardly from the feed-bar H and is in close contact with the front face of lever J, as shown in Fig. 1.

P is a lever, one end of which is pivoted to the frame A, while its opposite end is provided with an adjusting-screw $p$, the point of which rests upon the cam-shoulder R, which preferably forms an integral part of the cam-wheel M. This lever P passes directly beneath and sustains the feed-bar H, and a spring T depresses said feed-bar upon the lever, as shown.

S is a frame pivotally secured at one end to the sides A' of the bed A, and in its free end is properly journaled a compression-roller V.

In practice, the dough being prepared, it is rolled out and its edge placed upon the table A, the edge being inserted beneath the compression-roller and upon the feed-plate G. By now rotating the hand-wheel the feed-plate gradually feeds the dough forward to the edge of the machine, where it is cut off by the knives E in narrow strips. If it is desired to cut wide noodles, the adjusting-slide K is raised, so as to allow the pin N to travel upon a larger arc of circle on the face of the cam-wheel M. By depressing the slide K this travel of the pin N is limited, so as to cut narrow noodles. As the shaft C is rotated by the hand-wheel, the action of the cam-wheel is such as to advance the free end of the lever J, and this lever, acting upon the pin O, imparts a forward movement to the feed bar and plate, while the resiliency of the spring I retracts said feed bar and plate as the pin N slides down either of the cam faces $m$ of the wheel M. The action of the cam shoulder R is to alternately raise and lower the lever P, which in turn raises and lowers the feed bar and plate in the operation of the machine.

The description and drawings are deemed sufficient to enable any person skilled in the art to make and operate our improved device without entering into further details of construction.

What we claim as our invention is—

1. In a machine of the character described, a compression-roller, a frame pivotally secured at one end to the machine-bed and carrying in its free end said compression-roller, a feed-plate, means for raising and lowering said feed-plate and also moving the same forward and backward, and a cutter, substantially as specified.

2. In a machine of the character described, a feed-bar carrying a serrated plate, a compression-roller above said plate, an actuating-lever and cam-wheel to give said plate a forward movement, and a lever pivoted at one end to the machine-frame, said lever being in contact with said feed-bar, and a cam to give the last-mentioned lever vertical movement, whereby the feed-bar is given an upward movement, and any suitable driving mechanism, substantially as shown and described.

3. In combination, a bed-plate carrying a compression-roller, a feed bar and plate, a spring adapted to retract said feed bar and plate, a lever for advancing and a lever for raising the feed bar and plate, a rotatable shaft carrying a cam-wheel and cam-shoulder, and the means described for adjusting the play of said levers, substantially as set forth.

4. In combination, a bed A, compression-roll V, feed-plate G, feed-bar H, spring I, levers J and P, pins O and N, cam-wheel M and cam-shoulder R, mounted on the rotatable shaft C, cutting-wheel D, carrying knives E, and the adjusting-slide K, the parts being constructed, arranged, and operating substantially in the manner and for the purpose set forth.

In testimony whereof we affix our signatures, in presence of two witnesses, this 13th day of March, 1890.

AUGUST SKUBORVIUS.
SAMUEL FULDHEIM.

Witnesses:
JOS. A. OSBORNE,
C. J. CROSS.